(12) United States Patent
Chirol et al.

(10) Patent No.: US 11,486,781 B2
(45) Date of Patent: Nov. 1, 2022

(54) METHOD AND DEVICE FOR MONITORING THE CLAMPING OF AN ASSEMBLY BY A THREADED FASTENER

(71) Applicant: Airbus Operations (S.A.S.), Toulouse (FR)

(72) Inventors: Clément Chirol, Trebons sur la Grasse (FR); Patricia Morgue, Colomiers (FR); Manuel Paredes, Balma (FR); Simon Dols, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 240 days.

(21) Appl. No.: 16/803,595

(22) Filed: Feb. 27, 2020

(65) Prior Publication Data

US 2020/0191672 A1 Jun. 18, 2020

Related U.S. Application Data

(62) Division of application No. 15/347,417, filed on Nov. 9, 2016, now Pat. No. 10,724,913.

(30) Foreign Application Priority Data

Nov. 9, 2015 (FR) ....................................... 1560704

(51) Int. Cl.
*G01L 5/24* (2006.01)
*B25B 23/14* (2006.01)
*B23P 19/06* (2006.01)

(52) U.S. Cl.
CPC ................ *G01L 5/24* (2013.01); *B25B 23/14* (2013.01); *B23P 19/066* (2013.01)

(58) Field of Classification Search
CPC ........... G01L 5/24; B25B 23/14; B23P 19/066
See application file for complete search history.

(56) References Cited

U.S. PATENT DOCUMENTS 4,142,266 A * 3/1979 Dahl ..................... F16B 31/02
29/407.02
4,530,143 A 7/1985 Casarcia
(Continued)

FOREIGN PATENT DOCUMENTS

EP 2745989 A1 6/2014
FR 3000197 6/2014
(Continued)

OTHER PUBLICATIONS

French Search Report for Application No. 1560704 dated Jul. 26, 2016.
(Continued)

*Primary Examiner* — Rick K Chang
(74) *Attorney, Agent, or Firm* — Jenkins, Wilson, Taylor & Hunt, PA (57) ABSTRACT

A device for monitoring clamping of an assembly including at least one part to be clamped, an internally threaded element and an externally threaded element engaged in an internal thread of the internally threaded element. The device includes a driver to rotate one of the elements including the internally threaded element and the externally threaded element to clamp the assembly and a first sensor to measure a screwing torque of the driver, a tool for holding fixed against rotation the other of the elements including the internally threaded element and the externally threaded element, a second sensor to measure a reaction torque of the holding tool, a mechanism for determining a third parameter chosen from a time elapsed from a given time and a screwing angle from a reference position, and a calculation system to determine pre-tension in the externally threaded element.

8 Claims, 3 Drawing Sheets

(56) References Cited

U.S. PATENT DOCUMENTS

| | | | | |
|---|---|---|---|---|
| 7,182,147 | B2* | 2/2007 | Cutler | B25B 21/00 173/1 |
| 8,255,070 | B2* | 8/2012 | Gamboa | B25B 23/14 700/108 |
| 8,413,525 | B1* | 4/2013 | Schultz | B25B 23/14 73/862.338 |
| 8,443,703 | B2* | 5/2013 | Chen | B25B 23/1425 81/479 |
| 8,578,793 | B2* | 11/2013 | Carlin | G01L 25/003 73/862.21 |
| 9,032,602 | B2* | 5/2015 | Woods | F16B 19/1072 29/407.03 |
| 9,427,836 | B2* | 8/2016 | Sartor | B23P 19/04 |
| 10,724,913 | B2 | 7/2020 | Chirol et al. | |
| 2007/0144270 | A1* | 6/2007 | Crass | B25B 23/1425 73/862.21 |
| 2009/0064480 | A1* | 3/2009 | Migita | F16B 39/286 29/525.02 |
| 2009/0080996 | A1* | 3/2009 | Makimae | B25B 23/14 411/311 |
| 2009/0084232 | A1* | 4/2009 | Makimae | B23P 19/066 81/467 |
| 2011/0132157 | A1* | 6/2011 | Duvan | B25B 13/462 81/479 |
| 2014/0103641 | A1* | 4/2014 | Hickman | F16L 15/08 285/93 |
| 2017/0131165 | A1 | 5/2017 | Chirol et al. | |
| 2017/0203420 | A1* | 7/2017 | Finkenbiner | B23P 19/066 |

FOREIGN PATENT DOCUMENTS

| | | | | |
|---|---|---|---|---|
| WO | WO-2020075232 | A1 * | 4/2020 | G06F 3/01 |
| WO | WO-2020176334 | A1 * | 9/2020 | B25B 23/1475 |
| WO | WO-2020193956 | A1 * | 10/2020 | F16B 37/14 |

OTHER PUBLICATIONS

Restriction Requirement for U.S. Appl. No. 15/347,417 dated Jan. 11, 2019.

Non-Final Office Action for U.S. Appl. No. 15/347,417 dated Apr. 26, 2019.

Ex Parte Quayle Action for U.S. Appl. No. 15/347,417 dated Sep. 25, 2019.

* cited by examiner

METHOD AND DEVICE FOR MONITORING THE CLAMPING OF AN ASSEMBLY BY A THREADED FASTENER

CROSS-REFERENCE TO RELATED APPLICATION

This application is a divisional of U.S. patent application Ser. No. 15/347,417 filed Nov. 9, 2016 which claims priority to French Patent Application No. 1560704 filed Nov. 9, 2015, the entire disclosures of which are incorporated by reference herein.

TECHNICAL FIELD

The present disclosure concerns a method and device for monitoring the clamping of an assembly by a threaded fastener.

BACKGROUND

It relates in particular to improving the accuracy of the tightening, in particular improving the accuracy of the "pre-tension" force created when tightening a threaded fastener. This pre-tension is also commonly referred to as a preload or prestress. When carrying out an assembly using threaded fasteners, it is important to apply an appropriate pre-tension. This pre-tension makes it possible to hold the component parts of the assembly in contact and typically to compensate any additional forces caused by impact, vibration, pressure, sources of expansion or contraction—temperature or relative humidity variations.

A threaded fastener is generally a fastener employing a thread tightened by rotation or on which is mounted an internally threaded element tightened by rotation. This may notably mean a set screw screwed into an internally threaded hole, a nut-and-bolt or a nut tightened onto a stud.

The pre-tension is the force created on tightening a threaded fastener via the contact in the thread induced by the rotation of the nut or the bolt. In other words, this is the tension introduced into the assembly or the structure by tightening the threaded fastener.

Controlling the value of this force is notably important for the reliability over time of the assembly. Control herein means achieving a good accuracy of tightening, with a small spread around a target value.

In the prior art this problem is addressed via two distinct approaches. A first approach consists in optimizing the tightening techniques. For example, it is known to tighten a threaded fastener "by angle", i.e. by applying to the element to be tightened a rotation by a predefined angle from a given initial position that tightens it.

It is also known to tighten a fastener of this kind "by torque", i.e. by tightening until the tightening tool (for example a driver) reaches a predefined tightening torque.

Tightening can also be effected until it is determined that the elastic limit has been reached or to the onset of plastic deformation of the bolt, nut-and-bolt or stud.

It is also known to employ a so-called "tensioner" device replacing a nut on a bolt or a stud, the tensioner being a device of relatively complex construction enabling fine adjustment of the tension applied in the assembly.

These methods can be applied iteratively for greater precision, or even combined, for example by carrying out a pretightening by torque followed by a tightening by the required angle.

A second approach consists in instrumenting the assembly to determine the pre-tension applied. Various instruments are known for this purpose. Typically, a washer equipped with a piezo-electric sensor or a so-called preload indicating (PLI) washer may be inserted into the assembly. It is also known to employ tension indicator means marketed under the trade name Rotabolt®. Finally, dedicated devices may be employed to control the tightening, such as ultrasound devices, Bragg grating fiber sensors and strain gauges.

In the context of non-instrumented assemblies, corresponding to the least costly methods that are the quickest to use, typically in a industrial context, there is no method offering very good accuracy but quick to use.

For example, a simple bolt tightened by torque has a mediocre tightening accuracy, of the order of 30%, whereas a bolt tightened by torque and then by angle will have a slightly better tightening accuracy but takes longer to tighten.

SUMMARY

The disclosure herein aims to propose a method of clamping a non-instrumented assembly offering conjoint optimization of accuracy, cost and execution time.

This objective is achieved, for example, by a method of monitoring the clamping of an assembly including at least one part intended to be clamped, an internally threaded element and an externally threaded element engaged in an internal thread of the internally threaded element, the method including:
  holding one of the elements comprising the internally threaded element and the externally threaded element fixed in rotation relative to the other by a holding tool,
  rotating the other of the elements comprising the internally threaded element and the externally threaded element by a driver in order to clamp the assembly, and
  measuring a screwing torque corresponding to the torque exerted by the driver throughout a predefined time interval or tightening angle.

The method further includes, throughout the predefined time interval or tightening angle:
  measuring a reaction torque of the holding tool,
  measuring a third parameter chosen from a time elapsed from a given time and a screwing angle from a reference position; and
  determining the pre-tension in the externally threaded element, based on analyzing the evolution of the screwing torque and the reaction torque as a function of the third parameter.

By taking conjointly into account the screwing torque and the reaction torque and their evolution over time or with the tightening angle, the proposed method makes it possible to obtain very accurate tightening, with a low spread of the pre-tension around the required value, typically of the order of +/−15%, notably compared to conventional tightening by torque or by angle. The proposed method does not lead to any high overcost given the absence of dedicated instrumentation of the assembly or to any significant increase in execution time, notably because no step of measuring the tension after tightening is necessary.

According to one embodiment of the disclosure herein, determining the pre-tension includes taking account of a braking torque between the externally threaded element and the internally threaded element, of a residual clearance after the externally threaded element or the internally threaded element comes into contact with the part intended to be clamped, and of coefficients of friction in the assembly during tightening between the element rotated, which is either the internally threaded element or the externally threaded element, on the one hand, and the part intended to be clamped, on the other hand, and between the threads of the externally threaded element and the threads of the internally threaded element.

The pre-tension may determined with the aid of a predetermined curve.

Alternatively the pre-tension may determined by calculation as a mathematical function of the braking torque, the residual clearance and the coefficients of friction.

The screwing torque and the reaction torque may typically be modeled by functions of the third parameter and there are determined by analyzing the evolution of the functions: a phase of the elements of the assembly coming into contact, a phase of elimination of the residual clearances between the elements, and a phase of clamping the assembly.

The method of monitoring the clamping of an assembly may include:
calculating the difference between the screwing torque and the reaction torque, and
determining a time and a torque of coming into contact characteristic of the coming into contact of the externally threaded element or the internally threaded element and the part intended to be clamped by analyzing the evolution of the difference between the screwing torque and the reaction torque.

In particular, the method may include, by analyzing the evolution of the functions representing the screwing torque and the reaction torque during the execution of the method:
a step of determining a braking torque between the externally threaded element and the internally threaded element; and
a step of determining the value of the residual clearance in the assembly.

The method may include, for the screwing torque and the reaction torque, modeling the phase of coming into contact according to two affine functions over a first range of the third parameter, of the phase of eliminating the clearances by an affine function over a second range of the third parameter, and the clamping phase by an affine function over a third range of the third parameter; and
a step of determining a slope of the function presenting the screwing torque during the clamping phase;
a step of determining a slope of the function presenting the reaction torque during the clamping phase;
a step of calculating the coefficient of friction between the rotated element, which is either the internally threaded element or the externally threaded element, on the one hand, and the part intended to be clamped, on the other hand, and the coefficient of friction between the threads of the externally threaded element and the threads of the internally threaded element.

The disclosure herein also relates to a tightening method employing a method as described above during the clamping of an assembly, further including determining a target screwing torque as a function of the pre-tension that has been determined and applying the target screwing torque.

The disclosure herein can be implemented by a computer. The disclosure herein also relates to a computer program comprising instructions for executing a method as described above of monitoring the clamping of an assembly when it is loaded into and executed by a processor.

The disclosure herein further relates to a device for monitoring the clamping of an assembly including at least one part intended to be clamped, an internally threaded element and an externally threaded element engaged in an internal thread of the internally threaded element, the device including a driver configured to rotate one of the elements comprising the internally threaded element and the externally threaded element in order to clamp the assembly and a first sensor configured to measure a screwing torque of the driver, the device further including a tool for holding fixed against rotation the other of the elements comprising the internally threaded element and the externally threaded element.

The device includes:
a second sensor configured to measure a reaction torque of the holding tool,
a mechanism or device for determining a third parameter chosen from a time elapsed from a given time and a screwing angle from a reference position;
a calculation system configured to determine the pre-tension in the externally threaded element as a function of the evolution of the screwing torque and the reaction torque as a function of the third parameter.

The calculation system may be further configured to determine, by analyzing the evolution of the functions: a phase of the elements of the assembly coming into contact, a phase of eliminating the residual clearances between the elements, and a phase of clamping the assembly.

The calculation system may be further configured:
to determine, by analyzing the functions representing the screwing torque and the reaction torque, a braking torque between the externally threaded element and the internally threaded element; and
to determine, by analyzing the functions representing the screwing torque and the reaction torque, the residual clearance in the assembly.

The calculation system may be further configured:
to model, for the screwing torque and the reaction torque, the phase of coming into contact according to two affine functions over a first range of the third parameter, the phase of eliminating the clearances by an affine function over a second range of the third parameter and the tightening phase by an affine function over a third range of the third parameter;
to determine a slope of the function representing the screwing torque during the tightening phase;
to determine a slope of the function representing the reaction torque during the tightening phase; and
to calculate the coefficient of friction between the rotated element, which is either the internally threaded element or the externally threaded element, on the one hand, and the part intended to be clamped, on the other hand, and the coefficient of friction between the threads of the externally threaded element and the threads of the internally threaded element.

The calculation system may in particular be configured to determine the pre-tension taking account of the braking torque, the residual clearance and the coefficients of friction that have been calculated.

The calculation system may be configured to determine a target screwing torque as a function of the pre-tension that has been determined and the device further configured to apply the target screwing torque.

Other particular features and advantages of the disclosure herein will become more apparent in the following description.

BRIEF DESCRIPTION OF THE DRAWINGS

In the appended drawings, provided by way of non-limiting example.

DETAILED DESCRIPTION

Figure 1:
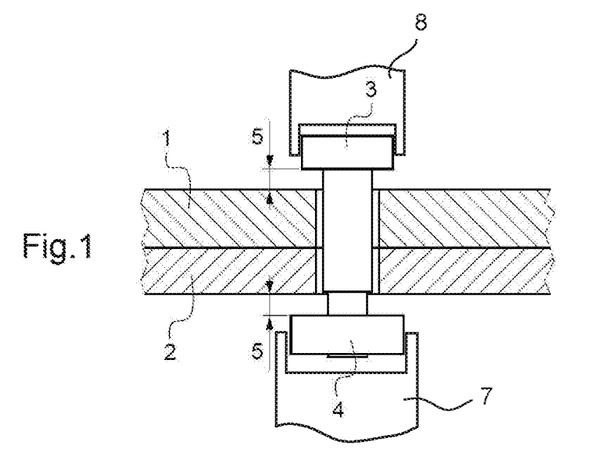
FIG. 1 represents diagrammatically one example of a theoretical initial tightening configuration with no defects or braking, for example at the origin of the curve in FIG. 2.
Figure 3:
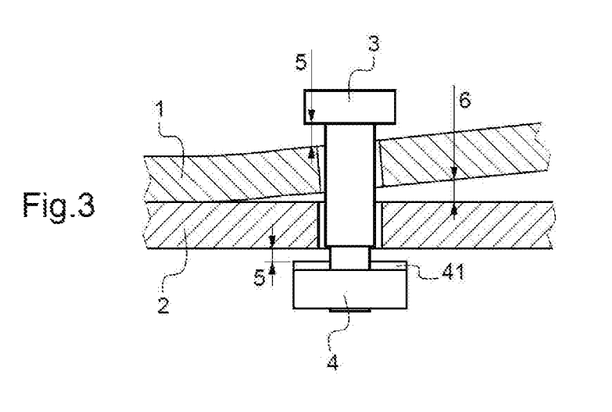
FIG. 3 represents diagrammatically an example of a theoretical initial tightening configuration with a residual gap in the assembly.

An assembly shown diagrammatically in FIGS. 1 and 3 comprises a first part 1 and a second part 2 connected by a bolt 3 and a nut 4. There are initially gaps 5 between the first element 1 and the bolt 3 and between the second element 2 and the nut 4. In the example represented here, the parts 1 and 2 are plates intended to be clamped one against the other.

Figure 2:
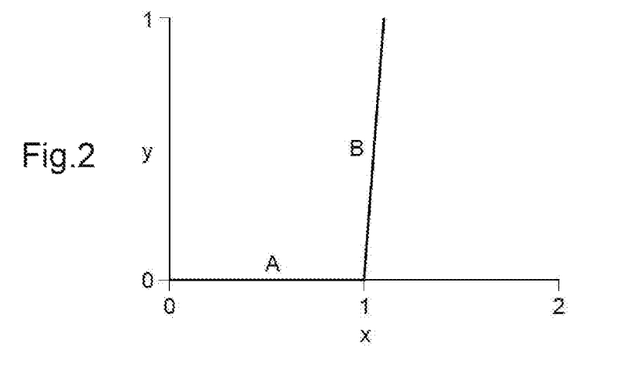
FIG. 2 is a graph showing a theoretical curve modeling tightening with no defects, as shown in FIG. 1.

Accordingly, during tightening with no defects, as represented in FIG. 1 for example, a theoretical torque-angle curve takes the form of the graph represented in FIG. 2, in which the abscissa (x) represents the screwing angle and the ordinate (y) represents the screwing torque. In a similar manner, the tightening can be represented by a torque-time curve. The tightening angle can be determined knowing a starting position and the angular speed of tightening. In a phase A of coming into contact (before contact of the nut and the bolt with the parts 1, 2), the angle (x) increases without the torque (y) changing (it remains substantially equal to zero in theoretical case of FIG. 1 in which the braking between the fixed element and the rotating element and the friction are assumed to be zero or negligible). The slope of this portion A of the curve is therefore close to zero.

In the tightening phase B, after the initial gaps 5 have been eliminated, the parts 1, 2 in contact form a closed system and, when the nut 4 continues to turn, and therefore to move along the bolt 3 because of the nature of the system comprising the bolt 3 and the nut 4, these parts 1, 2 are placed under increasing stress: the fastener is in a principal state of tension while the assembled elements 1, 2 are compressed. In particular, this establishes a pre-tension in the bolt 3.

The movement of the nut 4 along the bolt 3 being directly related to its rotation angle, a linear evolution of torque as a function of angle is seen. The slope of this straight line segment (portion B), i.e. a first derivative of this function or its slope, is directly dependent on the stiffnesses of the components involved in the stress chain, principally those of the fixing structure (here bolt 3-nut 4) and of the clamped parts 1, 2.

Accordingly, in a theoretically perfect case, when the clearances 5 have been taken up, i.e. when contact has been achieved, the slope has a predetermined value (or at least is within a tolerance zone in respect of the latter value), and tightening is preferably carried out until the torque has reached a value achieving a certain level of tightening (here the value 1 taken by way of example).

In a real configuration, the assembly generally has a residual clearance or gap 6, as shown in FIG. 3 for example. In addition to theoretical tightening torque to establish the pre-tension, there generally exists a braking torque, corresponding to a torque that is created as soon as screwing begins and that tends to oppose unscrewing of the assembly. For example, this torque may be generated and adapted by brake 41 such as a small deformation of the nut during its manufacture.

There are also two other torques involved during screwing and tightening, respectively generated on the one hand by the friction between the rotating element, typically the nut 4 in the example shown, and the plate 2 to be clamped after elimination of the gaps 5, and on the other hand by the friction between the threads of the bolt 3 and those of the nut 4 during screwing. These two torques are dissipated in part in the parts to be clamped (which are themselves held in a jig) but also in the tool holding the element that does not turn during tightening (the bolt or the nut).

In order to make it possible to take account of the effect of each of these torques when using a threaded fastener in an assembly, the screwing torque (the torque exerted by the driver 7 employed during tightening) is measured in the conventional way and the reaction torque, i.e. the torque at the level of the holding tool 8 for preventing rotation of the element (for example, either the bolt 3 or the nut 4) that is not rotated by the driver (i.e. the bolt 3 in the example of FIG. 1). In the present document, the term "driver" generally designates a tool adapted to screw in or out an internally or externally threaded element by applying a controlled torque, for example an electric or pneumatic screwdriver or a torque wrench.

Figure 4:
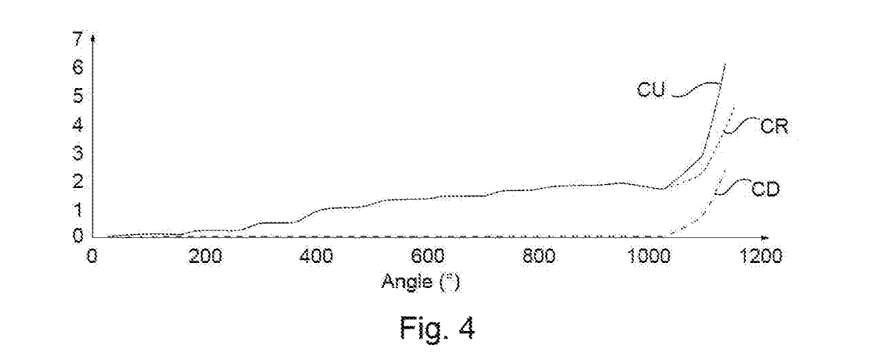
FIG. 4 represents an example of measurements of the screwing and reaction torques when clamping an assembly according to FIG. 3.

FIG. 4 shows an example of measurements of the screwing torque (CV) and the reaction torque (CR) and the difference (CD) between them when clamping an assembly according to FIG. 3. The value of the torque in Newton-meters (N.m.) is plotted on the ordinate axis and the screwing angle in degrees is plotted on the abscissa axis, the angle 0 corresponding to the beginning of rotation by the driver.

The curve CV corresponds to the measured screwing torque. The curve CR corresponds to the reaction torque. The curve CD corresponds to the difference between the screwing torque and the reaction torque.

The difference between the screwing torque and the reaction torque remains zero or substantially zero up to coming into contact, i.e. the actual bringing into contact of the elements of the fastener and of the part to be clamped of the finished assembly. In the example represented in FIG. 3, the difference between the screwing torque and the reaction torque remains substantially zero up to elimination of the gaps 5, i.e. the actual bringing into contact of the head of the bolt 3 with the first part 1 and of the nut 4 with the second part 2.

By analyzing the evolution of the difference between the screwing torque and the reaction torque it is therefore possible to determine the moment at which the elements of the assembly come into contact. In particular, this moment of coming into contact corresponds to the moment at which the difference between the screwing torque and the reaction torque ceases to be zero. This moment can also be determined by seeking the first point of inflection of the function representing the difference between the screwing torque and the reaction torque as a function of the screwing angle (or of the screwing time, for example).

This moment corresponds to the beginning of any elimination of residual clearances in the assembly and of the creation of a pre-tension therein. Knowing it makes it possible to make the determination of the pre-tension installed when clamping the assembly more accurate.

Figure 5:
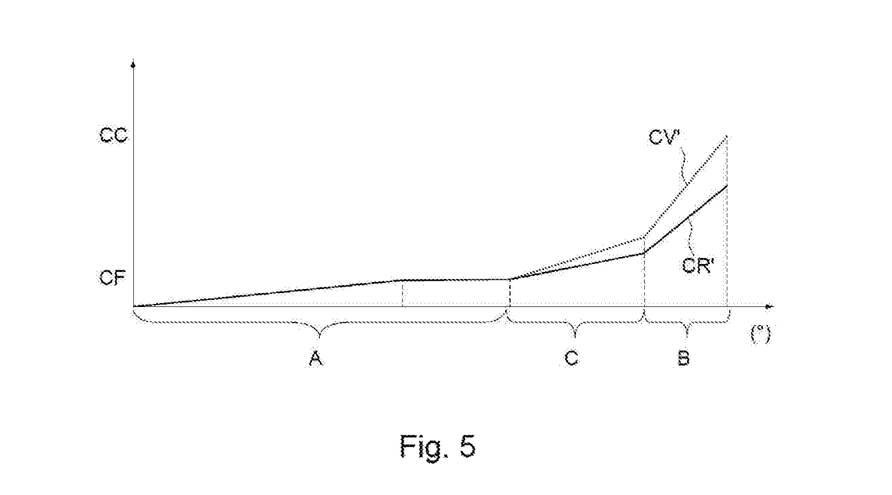
FIG. 5 shows a curve modeling the clamping of an assembly according to FIG. 3.

FIG. 5 shows a curve modeling the clamping of an assembly according to FIG. 3. Compared to FIG. 4, the evolution of the torque as a function of the screwing angle (the screwing time could equally well have been used) is represented by a succession of affine functions in a succession of screwing angle ranges.

Modeling of this kind makes it possible to effect a "subdivision" of the assembly process into successive phases, as described in the document FR3000197.

The torque (y)-angle (x) curves for the screwing torque (CV') and the reaction torque (CR') feature changes of slope representing intermediate phases, for example when a chain of surfaces in contact is established before the area of theoretical coming into contact of the parts 1, 2 to be clamped reaches the normally expected full plane-on-plane contact. There is then an intermediate phase C, after the phase A of coming into contact, in which the tightening stresses serve firstly "to eliminate" the residual clearances 6 and reach a plane-on-plane contact, in line with the fastener, before entering the tightening phase B.

The stiffnesses (slopes or slope of the representing function) encountered during the intermediate phase C are generally very different from the stiffness that characterizes the tightening phase B with full contact. The latter stiffness (the slope in the tightening phase B) remains close to the slope encountered in theoretical situation.

More particularly, after a phase A of coming into contact, there is an intermediate phase C corresponding to a phase of eliminating the residual clearance 6.

For example, if the parts 1, 2 to be clamped are pre-positioned in a configuration in which they are not entirely parallel and there is a small gap 6 between them in line with the fastener, which is referred to as the residual clearance, then a chain of contact is established elsewhere, while the elements 1, 2 to be clamped are initially loaded primarily in bending, before being compressed (during the clamping phase B) once the local residual clearance 6 has been eliminated. In the intermediate phase C, the stiffness of the elements that the fastener has to overcome is much lower than that present in the tightening phase B. The slope (i.e. the first derivative or slope) of the torque-angle curve during the intermediate phase C is therefore much lower than that of the actual tightening phase B.

It is noteworthy that in the example described here the phase A of coming into contact is divided into two sub-phases to which there correspond two different affine functions, two successive ranges of screwing angle. These two sub-phases correspond on the one hand to the increasing torque during the rotation of one of the externally threaded or internally threaded elements (the nut 4 in the examples shown) and on the other hand a sub-phase of substantially constant torque over a range of screwing angles, the sub-stantially constant torque of this "plateau" corresponding to the braking torque CF between the externally threaded element and the internally threaded element.

Nevertheless, in some configurations no torque plateau is observable, and the braking torque CF may be evaluated by the torque at the point of inflection of the curve between the phase A of coming into contact and the intermediate phase C. The intermediate phase C may equally well not exist, typically in the case of perfect plane contact between the first part 1 and the second part 2 from the beginning of the phase A of coming into contact, in which case the tightening phase B follows on from the phase A of coming into contact as in the FIG. 2 example and the braking torque is the torque at the point of inflection of the curve marking the passage from the phase A of coming into contact to the tightening phase B.

Analyzing the curves representing the screwing torque (CV') and the reaction torque (CR') makes it possible to obtain information making it possible to determine the pre-tension in the assembly.

The value of the residual clearance 6 can typically be determined by the size of the range of angles (or of the time interval) of the intermediate phase C, which can be calculated by determining the points of inflection of the curve (which reflect a variation of the first derivative or slope). If a graphical analysis of the function is carried out, the length of this range can be determined by projecting onto the abscissa axis the points of inflection marking the beginning and the end of the intermediate phase C, typically corresponding to the screwing angle (or time).

Moreover, the value of these coefficients of friction between on the one hand the element that is rotated (either the internally threaded element or the externally threaded element) and on the other hand the part intended to be clamped and of the coefficient of friction between the threads of the externally threaded element and the threads of the internally threaded element. These coefficients of friction can be determined on the basis of the respective slopes of the function representing the screwing torque (CV') and the function representing the reaction torque (CR') during the tightening phase.

The pre-tension in the assembly can then be determined accurately, taking account of the braking torque, the size or the value of the residual clearance, and the coefficients of friction that are operative in the assembly. The pre-tension can be determined with the aid of curves determined beforehand. Depending on the braking torque, the residual clearance and the coefficient of friction, the appropriate curve indicates the value of the pre-tension in the assembly. Alternatively, the pre-tension can be calculated using a mathematical function of the aforementioned three parameters (braking torque, residual clearance and coefficient of friction).

A target screwing torque (CC) can be determined or updated on the basis of the pre-tension that has been determined with a view to obtaining a target pre-tension in the assembly, i.e. in practice in the externally threaded element. This target torque may then be applied.

Although the above analysis is illustrated by curves representing the assembly of the screwing phases, this analysis is in practice carried out in real time (i.e. throughout screwing). For example, the first derivatives of the curves are calculated throughout screwing, so that their evolution, and in particular the points of inflection of the curves, are detected immediately. The parameters enabling calculation of the pre-tension are therefore calculated as screwing proceeds and the pre-tension is determined as it is established. It is therefore possible to refer to "continuous" measurements, calculations and analysis, i.e. at most with a time increment that is small compared to the screwing range (expressed as a time or angle).

Figure 6:
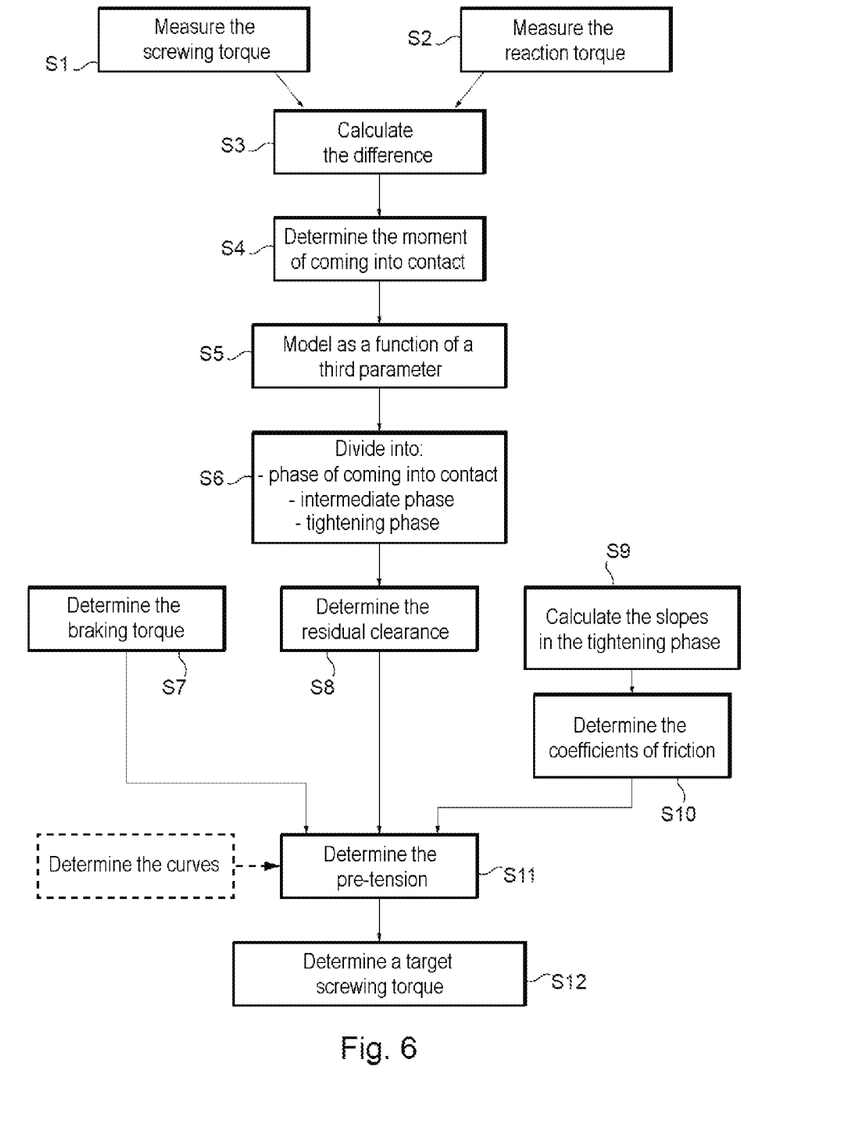
FIG. 6 represents a flowchart of the method according to one embodiment of the disclosure herein.

FIG. 6 represents a diagrammatic flowchart of the method according to one embodiment of the disclosure herein.

Thus the method represented in FIG. 6 includes: A step S1 of measuring the screwing torque, i.e. the torque at the level of the driver;

A step S2 of measuring the reaction torque at the level of the tool holding the element that does not turn, which is held to prevent it from rotating;

A step S3 of calculating the difference between these two torques makes possible an accurate determination of the moment of coming into contact during a step S4 of determining the moment of coming into contact of the components of the assembly at the level of the threaded fastener concerned, i.e. the coming into contact of the elements of the threaded fastener with the part or parts to be clamped.

The screwing and reaction torques are modeled in a modeling step S5 in the form of functions of a measured third parameter, typically the screwing angle or time. The two functions obtained, or the curves representing them if the problem is addressed graphically, are divided in a division step S6 into three distinct phases: the phase of coming into contact, an intermediate phase of eliminating the residual clearances, and a tightening phase. The division that is carried out is based on analyzing the variations of the function, in particular the variations of the first derivative of the functions in order to identify their points of inflection, or graphically in terms of slope variation.

This makes possible the execution of a step S7 of determining the braking torque (corresponding to a torque plateau in the phase of coming into contact), and a step S8 of determining the residual clearance (as a function of the range of the third parameter corresponding to the intermediate phase). This also makes it possible to calculate the slopes (calculation step S9) of the function representing the screwing torque in the tightening phase and the function representing the reaction torque in the tightening phase. The slopes determined in this way make it possible to determine coefficients of friction between the element that is rotated (either the internally threaded element or the externally threaded element) and the parts intended to be clamped and the coefficient of friction between the threads of the externally threaded element and the threads of the internally threaded element (step S10 of determining the coefficients of friction).

In a step S11 of determining the pre-tension, the latter is determined taking account of the braking torque, the residual clearance and the coefficients of friction that have been calculated. It is typically determined using predetermined curves. It may equally well be determined by calculation.

A target screwing torque can therefore be determined in a final step S12.

These steps are preferably conducted throughout the screwing process, i.e. "in real time". This continuous determination during screwing of the value of the braking torque and of the coefficients of friction within the assembly makes possible simultaneous estimation of the installed pre-tension.

The method according to the disclosure herein and the corresponding device do not necessitate instrumentation of the bolt and do not slow down the process in an industrial application compared to conventional tightening by torque.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for monitoring clamping of an assembly including at least one part intended to be clamped, an internally threaded element and an externally threaded element engaged in an internal thread of the internally threaded element, the device comprising:
    a driver configured to rotate one of the internally threaded element and the externally threaded element to clamp the assembly;
    a first sensor configured to measure a screwing torque of the driver;
    a holding tool for holding fixed against rotation the other of one of the internally threaded element and the externally threaded element;
    a second sensor configured to measure a reaction torque of the holding tool;
    a mechanism for determining a third parameter chosen from a time elapsed from a given time and a screwing angle from a reference position; and
    a calculation system configured to determine pre-tension in the externally threaded element as a function of an evolution of the screwing torque and the reaction torque as a function of the third parameter.

2. The device according to claim 1, wherein the calculation system is configured to determine, by analyzing evolution of the functions, a phase of the internally threaded and externally threaded elements of the assembly coming into contact, a phase of eliminating residual clearances between the internally threaded and externally threaded elements, and a phase of clamping the assembly.

3. The device according to claim 2, wherein the calculation system is configured to:
    determine, by analyzing functions representing the screwing torque and the reaction torque, a braking torque between the externally threaded element and the internally threaded element; and
    determine, by analyzing the functions representing the screwing torque and the reaction torque, a residual clearance in the assembly.

4. The device according to claim 2, wherein the calculation system is configured:
    for the screwing torque and the reaction torque, to model the phase of coming into contact according to two affine functions over a first range of the third parameter, the phase of eliminating the clearances by an affine function over a second range of the third parameter and the tightening phase by an affine function over a third range of the third parameter;

to determine a slope of the function representing the screwing torque during the tightening phase;

to determine a slope of the function representing the reaction torque during the tightening phase; and to calculate the coefficient of friction between the rotated element, which is either the internally threaded element or the externally threaded element, and the part intended to be clamped, as well as, and the coefficient of friction between the threads of the externally threaded element and the threads of the internally threaded element.

5. The device according to claim 3, wherein which the calculation system is configured:

for the screwing torque and the reaction torque, to model the phase of coming into contact according to two affine functions over a first range of the third parameter, the phase of eliminating the clearances by an affine function over a second range of the third parameter and the tightening phase by an affine function over a third range of the third parameter;

to determine a slope of the function representing the screwing torque during the tightening phase;

to determine a slope of the function representing the reaction torque during the tightening phase; and to calculate the coefficient of friction between the rotated element, which is either the internally threaded element or the externally threaded element, and the part intended to be clamped, as well as coefficient of friction between the threads of the externally threaded element and the threads of the internally threaded element.

6. The device according to claim 3, wherein the calculation system is configured to determine the pre-tension, taking account of the braking torque, the residual clearance, and the coefficients of friction that have been calculated.

7. The device according to claim 5, wherein which the calculation system is configured to determine the pre-tension, taking account of the braking torque, the residual clearance, and the coefficients of friction that have been calculated.

8. The device according to claim 7, wherein the calculation system is configured to determine a target screwing torque as a function of the pre-tension that has been determined, the device being configured to apply the target screwing torque.

* * * * *